US011573575B2

(12) United States Patent
Paglieroni et al.

(10) Patent No.: US 11,573,575 B2
(45) Date of Patent: Feb. 7, 2023

(54) ATTRACT-REPEL PATH PLANNER SYSTEM FOR COLLISION AVOIDANCE

(71) Applicant: Lawrence Livermore National Security, LLC, Livermore, CA (US)

(72) Inventors: David W. Paglieroni, Pleasanton, CA (US); N. Reginald Beer, Pleasanton, CA (US); David Chambers, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 318 days.

(21) Appl. No.: 16/603,977

(22) PCT Filed: Apr. 12, 2017

(86) PCT No.: PCT/US2017/027260
§ 371 (c)(1),
(2) Date: Oct. 9, 2019

(87) PCT Pub. No.: WO2018/190834
PCT Pub. Date: Oct. 18, 2018

(65) Prior Publication Data
US 2020/0117211 A1    Apr. 16, 2020

(51) Int. Cl.
*G05D 1/02*    (2020.01)

(52) U.S. Cl.
CPC .......... *G05D 1/0259* (2013.01); *G05D 1/0274* (2013.01); *G05D 2201/0212* (2013.01)

(58) Field of Classification Search
CPC .............. G05D 1/0259; G05D 1/0274; G05D 2201/0212; G05D 1/0238; G05D 1/0217
See application file for complete search history.

(56) References Cited

U.S. PATENT DOCUMENTS 5,006,988 A    4/1991    Borenstein et al.
6,134,502 A    10/2000    Sarangapani
(Continued)

FOREIGN PATENT DOCUMENTS

CN    104407616 A    3/2015
CN    105318888 A    2/2016
(Continued)

OTHER PUBLICATIONS

Ahuja et al., "Faster Algorithms for the Shortest Path Problem", Journal Assoc. Comput. Mach., vol. 37, No. 2, Apr. 1990, pp. 213-223.
(Continued)

*Primary Examiner* — Rami Khatib
*Assistant Examiner* — Shahira Baajour
(74) *Attorney, Agent, or Firm* — Perkins Coie LLP

(57) ABSTRACT

A system for determining a travel direction that avoids objects when a vehicle travels from a current location to a target location is provided. The system determines a travel direction based on an attract-repel model. The system assigns a repel value to the object locations and an attract value. A repel represents a magnitude of a directional repulsive force, and the attract value represents the magnitude of a directional repulsive force. The system calculates an attract-repel field having an attract-repel magnitude and attract-repel direction for the current location based on the repel values and their directions and the attract value and its direction. The system then determines the travel direction for a vehicle to be the direction of the attract-repel field at the current location.

23 Claims, 10 Drawing Sheets

(56) References Cited

U.S. PATENT DOCUMENTS

| | | |
|---|---|---|
| 6,712,312 B1 | 3/2004 | Kucik |
| 8,234,067 B2 | 7/2012 | Bauer et al. |
| 8,717,223 B2 | 5/2014 | Chambers et al. |
| 8,761,603 B1 | 6/2014 | Maleki |
| 8,766,845 B2 | 7/2014 | Hallquist et al. |
| 9,043,021 B1 | 5/2015 | Clark et al. |
| 9,102,406 B2 | 8/2015 | Stark et al. |
| 9,104,201 B1 | 8/2015 | Pillai et al. |
| 9,407,881 B2 | 8/2016 | Renkis |
| 9,429,945 B2 | 8/2016 | Pulleti et al. |
| 9,599,994 B1 | 3/2017 | Bogdanowicz et al. |
| 9,780,859 B2 | 10/2017 | Chang et al. |
| 9,798,329 B2 | 10/2017 | Shattil |
| 9,841,761 B2 | 12/2017 | Shehata et al. |
| 9,989,965 B2 | 6/2018 | Cuban et al. |
| 10,107,891 B1 | 10/2018 | Ngo et al. |
| 10,956,980 B1 | 3/2021 | Flick |
| 2004/0017312 A1 | 1/2004 | Anderson et al. |
| 2006/0184292 A1 | 8/2006 | Appleby et al. |
| 2006/0293792 A1 | 12/2006 | Hasegawa et al. |
| 2007/0021880 A1 | 1/2007 | Appleby et al. |
| 2007/0043502 A1 | 2/2007 | Mudalige et al. |
| 2007/0043506 A1 | 2/2007 | Mudalige et al. |
| 2007/0299947 A1 | 12/2007 | El-damhougy |
| 2010/0042269 A1 | 2/2010 | Kokkeby et al. |
| 2012/0207476 A1 | 8/2012 | Agrell et al. |
| 2012/0271461 A1 | 10/2012 | Spata |
| 2013/0116880 A1 | 5/2013 | Shitamoto et al. |
| 2013/0162822 A1 | 6/2013 | Lee et al. |
| 2013/0274986 A1 | 10/2013 | Trepagnier et al. |
| 2014/0316616 A1 | 10/2014 | Kugelmass |
| 2015/0234387 A1 | 8/2015 | Mullan et al. |
| 2015/0336269 A1 | 11/2015 | Linnell et al. |
| 2015/0336668 A1 | 11/2015 | Pasko et al. |
| 2016/0070265 A1 | 3/2016 | Liu et al. |
| 2016/0116915 A1 | 4/2016 | Pulleti et al. |
| 2016/0140851 A1 | 5/2016 | Levy et al. |
| 2016/0210863 A1 | 7/2016 | Kohn-rich |
| 2016/0327959 A1 | 11/2016 | Brown et al. |
| 2017/0088130 A1 | 3/2017 | Suzuki et al. |
| 2017/0097645 A1 | 4/2017 | Garland |
| 2017/0235316 A1 | 8/2017 | Shattil |
| 2017/0301249 A1 | 10/2017 | Kunzi et al. |
| 2017/0301250 A1 | 10/2017 | Ell et al. |
| 2018/0074174 A1 | 3/2018 | Beer et al. |
| 2018/0074520 A1 | 3/2018 | Liu et al. |

FOREIGN PATENT DOCUMENTS

| | | |
|---|---|---|
| EP | 2595024 A1 | 5/2013 |
| JP | 2006515233 A | 5/2006 |
| JP | 2014119901 A | 6/2014 |
| JP | 2014219723 A | 11/2014 |
| KR | 20150086065 A | 7/2015 |
| KR | 1020150136209 | 12/2015 |
| WO | 2018009189 A1 | 1/2018 |
| WO | 2018190833 A1 | 10/2018 |
| WO | 2018190834 A1 | 10/2018 |

OTHER PUBLICATIONS

Chambers, H., D., "Estimation of time-of-arrivals and contacts," 12 pages.

Chambers, H., D., "Gradient Descent Navigation Method for Collision Avoidance," 9 pages.

Chi, Tieng et al. "A Strategy of Multi-robot Formation and Obstacle Avoidance in Unknown Environment," Proceedings of the IEEE, China, Aug. 2016.

Dijkstra "A Note on Two Problems in Connexion with Graphs", Numerische Mathematik, vol. 1, 1959, pp. 269-271.

Freedman, et al., "Fibonacci Heaps and their Uses in Improved Network Optimization Algorithms", Journal Assoc. Comput. Mach., vol. 34, No. 3, Jul. 1987, pp. 596-615.

Gageik, et al., "Obstacle Detection and Collision Avoidance for a UAV With Complementary Low-Cost Sensors," IEEE Access, vol. 3, Jun. 2015.

Goerzen, et al., "A Survey of Motion Planning Algorithms from the Perspective of Autonomous UAV Guidance," © Springer Science + Business Media B.V. 2009.

Hart, et al., "A Formal Basis for the Heuristic Determination of Minimum Cost Paths," IEEE, vol. ssc-4, No. 2, Jul. 1968.

Hrabar, "Reactive Obstacle Avoidance for Rotorcraft UAVs,"2011 IEEE/RSJ International Conference on Intelligent Robots and Systems Sep. 25-30, 2011. San Francisco, CA, USA.

International Search Report and Written Opinion, received in Application No. PCT/US17/27253, dated Feb. 2, 2018, 27 pages.

Kendoul, et al., "Survey of Advances in Guidance, Navigation, and Control of Unmanned Rotorcraft Systems," Journal of Field Robotics 29(2), 315-378 (2012).

Khatib, "The potential filed approach and operational space formulation in robot control," Proc. Fourth Yale Workshop on Applications of Adaptive Systems Theory Yale University, May 1985.

Luque-Vega, et al., "Distributed Control for Multiple Quadrotors with Obstacle Avoidance Using Potential Fields," WAC 2016 1570244885.

Martin, et al., "Robot Evidence Grids," The Robotics Institute Carnegie Mellon University Pittsburgh, Mar. 1996.

Masoud, "Kinodynamic Motion Planning," IEEE Robotics & Automation Magazine, Mar. 2010.

Maurer, et al., "A Linear Time Algorithm for Computing Exact Euclidean Distance Transforms of Binary Images in Arbitrary Dimensions," IEEE, vol. 25, No. 2, Feb. 2003.

Paglieroni, "A Unified Distance Transform Algorithm and Architecture", Machine Vision and Applications, vol. 5, 1992, pp. 47-55.

Paglieroni, "Matching Random Tree Models of Spatio-Temporal Patterns to Tables or Graphs", Proc. IEEE Conf. Computational Intelligence and Data Mining (CIDM), Honolulu, HI, Apr. 1-5, 2007, pp. 560-567.

Paul et al. "UAV Formation Flight using 3D potential Filed," Department of Engineering Cybernetics, Norway, 2008.

Rizqi et al. "Path Planning and Formation Control via Potential Function for UAV Quadrotor," ARIS 2014, Taipei, Taiwan.

Rosenfeld, et al., "Sequential Operations in Digital Picture Processing," Journal of the Association for Computing Machinery, vol. 13, No. 4, 1966, pp. 471-494.

Scherer, et al., "Flying Fast and Low Among Obstacles: Methodology and Experiments," The International Journal of Robotics Research vol. 27, No. 5, May 2008, pp. 549-574.

Xu, Shengdong et al. "Real Time 3D Navigation for Autonomous Vision-Guided MAVs," IEE/RSJ 978-1-4799-9994-1/15, 2015, Hamburg, Germany.

Yan et al. "Path Planning in Complex 3D Environment Using a Probabilistic Roadmap Method," International Journal of Automation and Computing, 10(6), Dec. 2013, 525-533.

Zelek, "Dynamic Path Planning," Centre for Intelligent Machines & Dept. of Electrical Engineering McGill University, Montreal, Quebec, Canada, H3A 2A7.

Barnes, L., et al., "Swarm formation control utilizing elliptical surfaces and limiting functions." IEEE Transactions on Systems, Man, and Cybernetics, Part B (Cybernetics) 39.6 (2009): 1434-1445. (Year: 2009).

Bennet, D.J. and C.R. McInnes,"Autonomous Three-Dimensional Formation Flight for a Swarm of Unmanned Aerial Vehicles," J. Guidance, Control, and Dynamics, vol. 34, No. 6, Nov.-Dec. 2011, pp. 1899-1908.

Cavazzuti, M., "Optimization Methods: From Theory to Design," Springer-Verlag Berlin Heidelberg, 2013, chap. 2, pp. 13-56.

Clark, R. et al., "Autonomous Swarm Testbed with Multiple Quadcopters," Proceedings of the 1st World Congress of Unmanned Systems Engineering, 2014.

Cruz, Y.I., "An Algorithm for Autonomous Formation Obstacle Avoidance," Thesis for Master of Science in Aeronautics and Astronautics, University of Washington, 2013.

Examination Report dated Jan. 27, 2021 in European Patent Application No. 16831542.2, 5 pages.

(56) References Cited

OTHER PUBLICATIONS

Fink, M. and C. Prada, "Acoustic Time-Reversal Mirrors," Institute of Physics Publishing, Inverse Problems, 17:R1-R38, 2001.
International Search Report and Written Opinion for PCT/US2016/041208, dated Mar. 20, 2017, 11 pages.
Kuhn, H., W., "The Hungarian Method for the Assignment Problem", Naval Research Logistics Quarterly, vol. 2, 1955, pp. 83-97.
Kushleyev, A. et al., "Towards a Swarm of Agile Micro Quadrotors," GRASP Lab, University of Pennsylvania, 2013.
Lum, C. et al., "Formation Flight of Swarms of Autonomous Vehicles in Obstructed Environments Using Vector Field Navigation," University of Washington, 2012.
Maurer, C., et al., "A Linear Time Algorithm for Computing Exact Euclidean Distance Transforms of Binary Images in Arbitrary Dimensions," IEEE Transactions on Pattern Analysis and Machine Intelligence, vol. 25, No. 2, Feb. 2003, pp. 265-270.
Ong, M. S., "A Mission Planning Expert System with Three Dimensional Path Optimization for the NPS Model 2 Autonomous Underwater Vehicle", Naval Postgraduate School, Theses and Dissertations, Jun. 1990, California, 194 pages.
Ong, S.M. "Calhoun: The NPS Institutional Archive Theses and Dissertations Thesis and Dissertation Collection a Mission Planning Expert System with Three-Dimensional Path Optimization for the NPS Model 2 Autonomous Underwater Vehicle", Jun. 1, 1990.
Orlin, B., J., et al., "New Scaling Algorithms for the Assignment and Minimum Cycle Mean Problems", Mathematical Programming, vol. 54, 1992, pp. 41-56.
Ouellet D. et al., "Control of Swarms of Autonomous Robots Using Model Driven Development—A State-Based Approach," IEEE 2011, 8 pages.
Paglieroni, D., et al., "Matching Random Tree Models of Spatio-Temporal Patterns to Tables or Graphs", Proceedings IEEE Conference on Computational Intelligence and Data Mining (CIDM), Honolulu, HI, Apr. 1-5, 2007, pp. 560-567.
Paglieroni, D., et al., "A Unified Distance Transform Algorithm and Architecture," Machine Vision and Applications, vol. 5, Issue 1, 1992, pp. 47-55.
Rosenfeld A., et al., "Sequential Operations in Digital Picture Processing," Journal of the Association for Computing Machinery, vol. 13, No. 4, 1966, pp. 471-494.
Second Notice of Preliminary Rejection dated Feb. 26, 2021 in Korean Patent Application No. 10-2019-7003709 with English translation, 15 pages.
Song Gwang Yul "System and method for path planning for autonomous navigation of driverless ground vehicle" (Year: 2015).
Vasarhelvyi, G. et al., "Outdoor Flocking and Formation Flight with Autonomous Aerial Robots," MT-ELTE Research Group for Statistical and Biological Physics, Budapest, Hungary, 2014.
Xue, Z. and J. Zeng, "Formation Control Numerical Simulations of Geometric Patterns for Unmanned Autonomous Vehicles with Swarm Dynamical Methodologies," 2009 International Conference on Measuring Technology and Mechatronics Atuomation, 6 pages.
Yudong Zhang et al: "UCAV Path Planning by Fitness-Scaling Adaptive Chaotic Particle Swarm Optimization", Mathematical Problems in Engineering, vol. 2013, No. 9, Jun. 28, 2013 (Jun. 28, 2013), pp. 1-9.
Zhang, Y., et al., "UCAV Path Planning by Fitness-Scaling Adaptive Chaotic Particle Swarm Optimization", Mathematical Problems in Engineering, vol. 2013, Article ID 705238, Jul. 2013, 9 pages.
International Search Report and Written Opinion of Paglieroni et al., issued in International Application No. PCT/US17/27260, dated Dec. 22, 2017, 20 pages.
Sfeir, J., et al., "An Improved Artificial Potential Field Approach to Real-Time Mobile Robot Path Planning in an Unknown Environment", 978-1-4577-0820, IEEE, Jul. 2011.

ATTRACT-REPEL PATH PLANNER SYSTEM FOR COLLISION AVOIDANCE

STATEMENT REGARDING FEDERALLY SPONSORED RESEARCH

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND

Unmanned aerial vehicles ("UAVs"), also referred to as unmanned aircraft systems ("UAS") or drones, are employed for a wide variety of applications such as military, scientific, commercial, humanitarian, and recreational applications. UAVs can be controlled in various ways that range from autonomous control by a navigation system to remote control by an operator. The navigation (or guidance) systems that provide autonomous control may be on board the UAVs or at ground stations that receive data from the UAVs and transmit instructions to the UAVs. A navigation system may simply navigate the UAV to a destination location along a specified route (e.g., a straight line) defined by Global Positioning System ("GPS") coordinates. More sophisticated navigation systems may interface with an onboard imaging system that collects images of the environment near the UAV. The navigation system may process the images to identify obstacles in the way of the UAV (e.g., buildings, mountains, and trees) and direct the UAV on a route to avoid the obstacles. When a UAV is under remote control of an operator, the UAV may have an onboard camera system that streams images of the environment to the operator. If the UAV does not have an onboard camera system, the operator needs to have a line of sight to the UAV. The operator may use various cockpit-type controls to guide the UAV.

Navigation systems that process images to identify obstacles can be very expensive and can add significant weight to a UAV. These navigation systems include camera systems, image processing systems, obstacle detection systems, route planning systems, and so on. A significant portion of the expense is driven by the computational and storage resources that are needed to process the images. Each image may require tens of megabytes for storage. To process the images in real time, the navigation systems may require high-end processing systems and custom-designed processors. The expense and weight of such navigation systems make them impractical for use by UAVs except in high-end military applications. As a result, UAVs for commercial and recreational use are remotely controlled based on having a line of sight to the UAVs.

DETAILED DESCRIPTION

Figure 1:
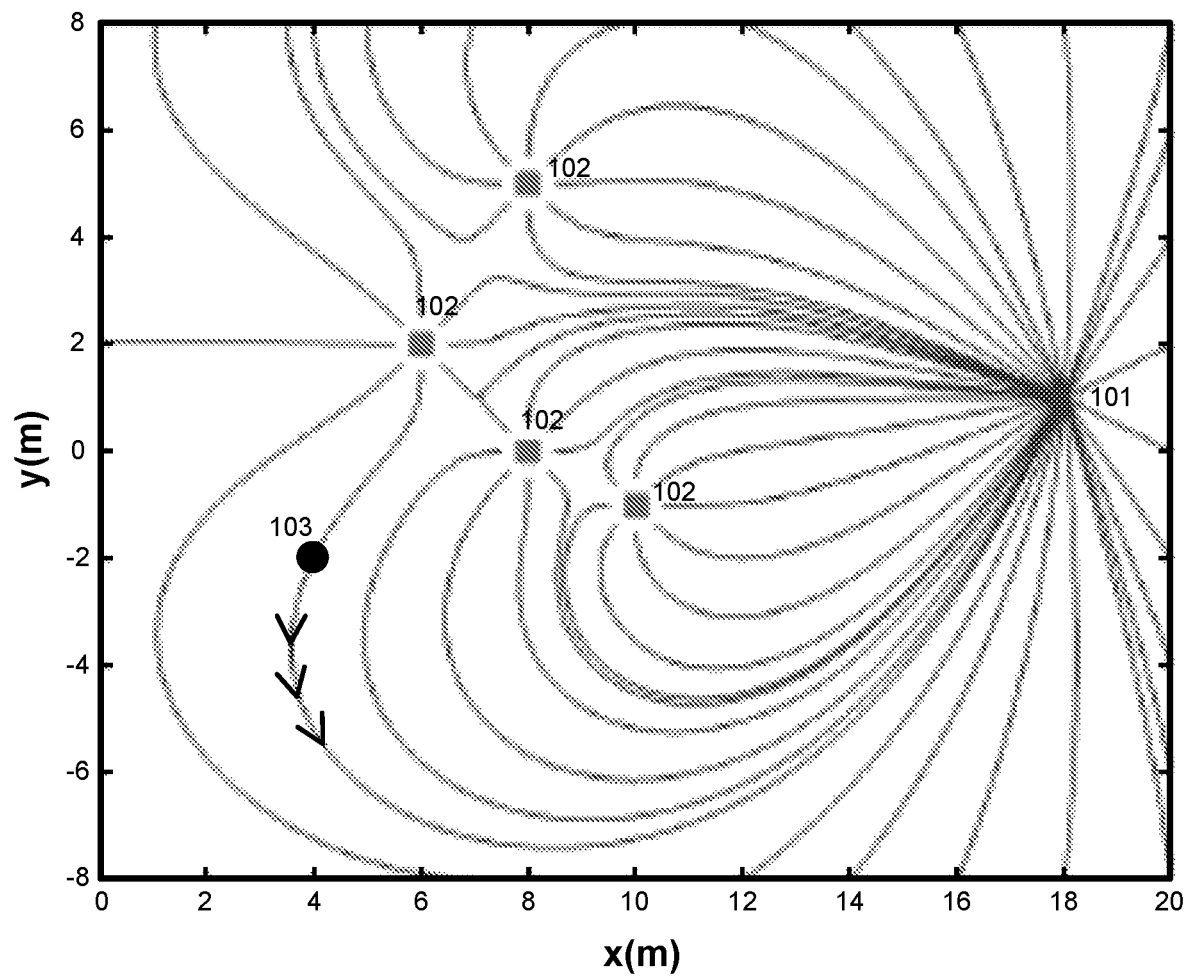
FIG. 1 illustrates one configuration of field lines.

A method and system for determining a travel direction that avoids objects when traveling from a current location to a target location is provided. In some embodiments, an attract-repel path planner ("ARPP") system determines at intervals a travel direction for a vehicle to travel to a target or destination location so that the objects are avoided based on an attract-repel model. At each interval, the ARPP system receives object locations of objects that are to be avoided. The object locations are identified based on data collected by a sensor array. The sensor array transmits signals at each interval and collects return signals, which are transmitted signals reflected by objects. Each object location specifies a single point in space that is determined based, at least in part, on travel time of a return signal and direction of a return signal. An object is anything or any area that the vehicle is to avoid such as walls, ceilings, floors, doors, cabinets, buildings, power lines, bridges, plants, equipment, people, the ground, certain elevations, exclusion zones, other vehicles, and so on. The ARPP system assigns a repel value to the object location of each object. A repel value is a measure of a repulsive force that the object at the object location is considered to exert. The repulsive force increases as the distance from the object location decreases. The repulsive force is in directions that extends radially from the object location. The ARPP system also assigns an attract value to the target location. An attract value is a measure of an attractive force that a target at the target location is considered to exert. The attractive force increases as the distance from the target location decreases. The attractive force is in directions that extend radially from the target location. For example, the objects may be modeled as having positive electrostatic charges, and the repel values may represent the magnitude (e.g., in Coulombs) of the positive electrostatic charges. The target may be modeled as having a negative electrostatic charge, and the attract value may represent the magnitude of the negative electrostatic charge. After assigning the repel values and the attract value, the ARPP system calculates an attract-repel vector having an attract-repel magnitude and an attract-repel direction for the current location based on the repel values and their directions and the attract value and its direction. The attract-repel field for the current location is a vector that represents the cumulative force of the repulsive forces and the attractive force at the current location and the cumulative direction of the cumulative force at the current location. For example, with the forces modeled as electrostatic charges, the attract-repel field for the current location is represented by the electric field at the current location. The ARPP system determines the travel direction for a vehicle at the current location to be the direction of the attract-repel field at the current location. The ARPP system then provides the travel direction so that the vehicle can travel in the travel direction until the next interval.

In some embodiments, an object location corresponds to a "contact point" that represents the sources of the reflected pulses (e.g., a radar reflection. A contact point could be generated by a reflection from a point-like object, moving or stationary, by specular reflection from the surface of a larger object, or by a reflection from the edge or corner of a larger object. These possibilities, in general, cannot be distinguished from a single collection of the radar. They might be distinguishable by tracking how the contact points move over multiple radar looks as the vehicle moves. Nevertheless, the primary use of the contact points is to provide information to the vehicle about regions to avoid as it navigates toward a predetermined location (i.e., the target). If an object is large (e.g., a building or a bridge), the object detection system may represent the "object" as a collection of object locations. For example, a building with a base that is 20 square meters and a height of 50 meters be represented by 100 objects on 5 meter sub-cubes on the faces of the building.

In some embodiments, the ARPP system may employ various force laws to determine travel direction for a vehicle. Suitable force laws may include Coulomb's law, Voronoi fields (Dmitri Dolgov, Sebastian Thrun, Michael Montemerlo, James Diebel, "Practical Search Techniques in Path Planning for Autonomous Driving," Proceedings of the First International Symposium on Search Techniques in Artificial Intelligence and Robotics, June 2008), and Maxwell's equations (A. M. Hussein and A. Elnagar, "Motion Planning Using Maxwell's Equations," Proceedings of the 2002 IEEE/RSJ International Conference on Intelligent Robots and Systems, October 2002).

In some embodiments, the ARPP system employs an analogy from the physics of electric fields produced by static charge distributions to determine travel direction for a vehicle at a given time. A review of some properties of the physics of static charges is provided. The force between two point charges $Q_a$ and $Q_b$ is given by Coulomb's law, as illustrated by Equation 1:

$$F_{ab} = \frac{1}{4\pi\varepsilon_0} \frac{Q_a Q_b}{r^2} r, \quad r = \frac{(x_b, y_b, z_b)}{r} \quad (1)$$

where $\varepsilon_0$ is the permittivity of free space, r is the distance between the two point charges, $(x_b, y_b, z_b)$ are the coordinates of charge $Q_b$ relative to charge $Q_a$, and r is the unit vector specifying the direction from $Q_a$ to $Q_b$. (See Electromagnetic Fields and Waves, Paul Lorrain and Dale Corson, W. H. Freeman and Company, San Francisco, 1970.) This vector is defined so that the force between the two charges is repulsive when the charges are the same sign (e.g., both positive), and attractive when they are opposite signs. The electric field at $Q_b$ produced by $Q_a$ is the force per unit charge, $E_a = F_{ab}/Q_b$. It is often convenient to represent the electric field as the gradient of a potential $V_a$ at any given point, as illustrated by Equation 2:

$$E_a = -\nabla V_a, \quad V_a = \frac{Q_a}{4\pi\varepsilon_0 r}, \quad \nabla = \left(\frac{\partial}{\partial x}, \frac{\partial}{\partial y}, \frac{\partial}{\partial z}\right) \quad (2)$$

For a distribution of point charges, the electric or potential fields from each charge can be summed to obtain the total fields. More generally, if $\rho(r)$ is the charge density in space, the electric and potential fields are solutions of the partial differential equation of Equation 3:

$$\nabla \cdot E = -\nabla^2 V = \frac{\rho(r)}{\varepsilon_0}, \quad \nabla^2 = \frac{\partial^2}{\partial x^2} + \frac{\partial^2}{\partial y^2} + \frac{\partial^2}{\partial z^2} \quad (3)$$

This equation states that the divergence of the electric field and the Laplacian of the potential are proportional to the charge distribution. In regions of space with no charge ($\rho=0$), the divergence of the electric field is zero—that is, every field line that enters the region also exits the region. Furthermore, the Laplacian of the potential is zero, which means that the minimum or maximum of the potential in a given region occurs at the boundary of the region—that is, there are no local minima or maxima of the potential inside a region with no charge. The field line at any given point is tangent to the direction of the electric field and is also the direction of maximum gradient of the potential. Field lines begin and end at charges or the point at infinity. By convention, field lines originate at positive charges and terminate at negative charges. If there are equal amounts of positive and negative charge, then all field lines will originate at positive charges and terminate at negative charges; no field lines will extend to infinity. FIG. 1 illustrates one configuration of field lines. The electric field lines for a configuration of four positive charges 102 and one large negative charge 101 is illustrated. The field lines radiate away from the positive charges and converge to the negative charge.

The ARPP system may use these properties of the electrostatic fields to determine the travel direction for a vehicle. When the ARPP system assigns a positive charge to each object location and a negative charge to the target location, the electric field calculated at the current location will point away from the object location. Moving in this direction, the vehicle will follow the field line away from all object location and eventually end up either at infinity or at the target location. When the ARPP system sets the charge of the target location to be equal or greater in magnitude to the sum of charges of the object location, all the field lines will terminate at the target location and the vehicle will arrive at the target location while avoiding all objects. Because the field direction is the direction of maximum descending gradient of the potential, the ARPP system may be considered to be a gradient descent technique for navigation.

Figure 2:
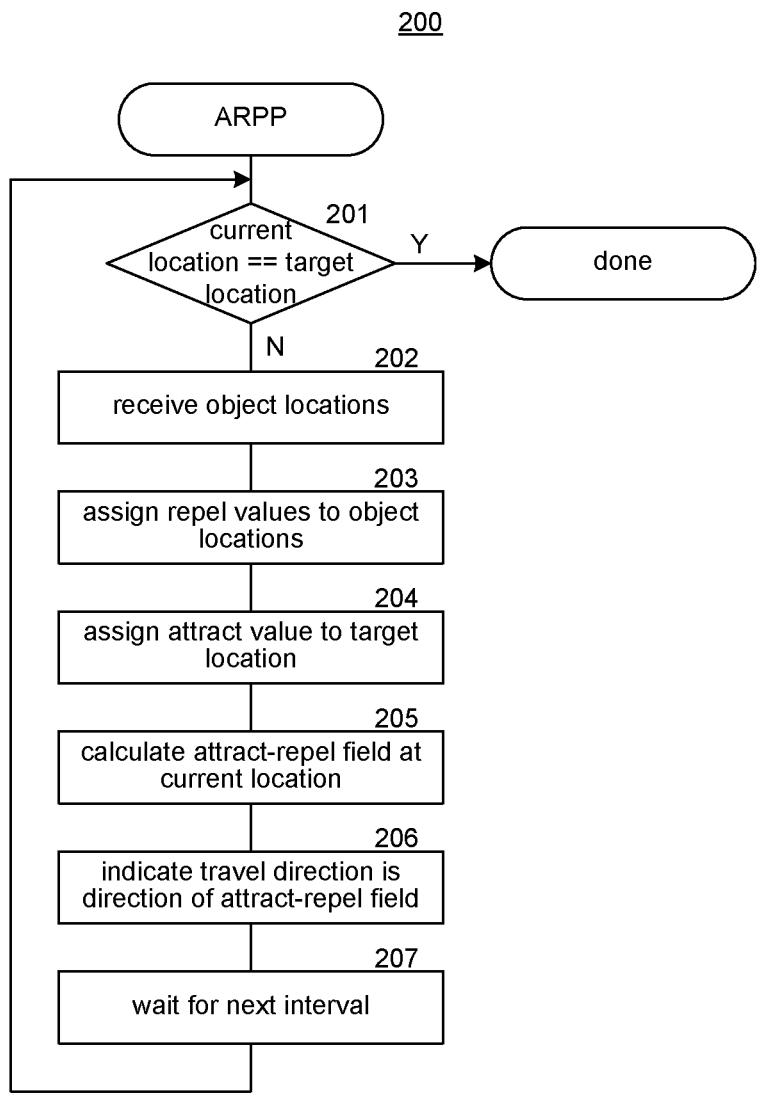
FIG. 2 is a flow diagram that illustrates the overall processing of the ARPP system in some embodiments.

FIG. 2 is a flow diagram that illustrates the overall processing of the ARPP system in some embodiments. The ARPP system 200 repeatedly receives object locations and determines a travel direction until the vehicle arrives at the target location. Referring to FIG. 1, the ARPP system calculates a travel direction for the vehicle 103 that is in the direction of the field (or actually the reverse direction, if objects are assigned a positive charge) at the current location of the vehicle. In decision block 201, if the current location of the vehicle is the same as the target location, then the vehicle has arrived at the target location and the ARPP system completes, else the ARPP system continues at block 202. In block 202, the ARPP system receives the object locations of the objects. In block 203, the ARPP system assigns repel values to the object locations. For example, the ARPP system may assign repel values representing positive charges that are equal to or close to one. Alternatively, if the sensor system assigns confidence values to the objects indicating confidence that a detected object is an actual object, the ARPP system may set the charges to be proportional to the confidence value so that contacts with low confidence values have less influence on the path planning than those with high confidence values. In block 204, the ARPP system assigns an attract value to the target location. For example, the ARPP system may assign an attract value representing a negative charge that is relative to the positive charges assigned to the object location. To help ensure that all field lines terminate at the target location, the attract value may be less than or equal to the negative of the sum of the repel values. Alternatively, the attract value could be greater than the negative of the sum of the repel values because the object locations can change over the intervals as the vehicle travels past objects and the field of perception of the sensor array of the vehicle changes. With a smaller attract value, the objects have more influence on the travel direction—that is, the vehicle avoids the objects with a greater margin, providing a smaller risk tolerance of a collision with an object (e.g., a conservative behavior). With a larger attract value, the objects have less influence on the travel direction—that is, the vehicle avoids the object with a smaller margin, providing a higher risk tolerance of collision with an object (e.g., a risky behavior). In some embodiments, the ARPP system may set the repel values of the object locations based on the distance between the object location and the target location. For example, the ARPP may set a repel value to increase with distance from the target location so that its contribution to the attract-repel field at the vehicle becomes independent of the distance between the current location and the target location.

In block 205, the ARPP system calculates the attract-repel field for the current location. The attract-repel field may be set based on the electric field derived using Coulomb's law. Alternatively, the attract-repel field may be based on repulsive forces and an attractive force that monotonically decrease with distance. In addition, the ARPP system may assign different repel values to each object. For example, the different repel values may be selected for different classes of objects with different risk tolerances, such as moving objects and stationary objects. The repulsive force exerted on a location may decrease faster than the inverse of the square of the distance, such as the cube of the distance. With a faster-decreasing repulsive force, the repulsive force from objects that are farther away is decreased and that are closer is increased. The ARPP system calculates a repel field for the current location based on each repel value and an attract field—based attract value and then sums the fields to give the attract-repel field.

In block 206, the ARPP system indicates that travel direction is the direction of the attract-repel field. The ARPP system also specifies the travel distance to travel in the travel direction. The travel distance may be a constant distance based on experiences traveling in similar environments (e.g., a city with tall buildings or a rural area). The travel distance any also be based on the magnitude of the attract-repel field. A large magnitude means that the current location is closer to an object, so a small travel distance may be appropriate. In block 207, the ARPP system waits for the next interval and then loops to block 201 to repeat the processing.

In some embodiments, the ARPP system may select a travel direction based not only on the received object locations for the current interval, but also on the received object locations for prior intervals. If an object is no longer in the field of perception of the sensor array, then the travel direction may be set to be toward that object. During the next interval, that object may again be in the field of perception and the travel direction may be set to be away from that object. To avoid having the travel direction oscillate between toward and away from that object, the ARPP system calculates the travel direction based on object locations of prior objects received during prior intervals even though the object location of a prior object is not received for the current interval, because the prior object is no longer in the field of perception. By calculating the travel direction based on the location of such prior objects, the ARPP can avoid such oscillation in travel direction. As the number of prior objects may be quite large, the ARPP system may reduce the repel value that is assigned to the object locations of the prior objects based on the number of intervals since the prior object was last perceived. For example, the ARPP system may assign an exponentially decaying repel value.

In some embodiments, the ARPP system may factor in knowledge of stationary objects such as fixed obstacles (e.g., buildings), ground topography (e.g., mountains), and exclusion zones (e.g., areas surrounding an airport) when assigning repel values. The attract-repel fields at various locations resulting from the repel values assigned to these stationary objects can be pre-calculated. In such a case, the ARPP system need only calculate the attract-repel fields for moving objects or new stationary objects), then sum the newly calculated attract-repel fields and the pre-calculated attract-repel fields for the current location.

In some embodiments, the ARPP system may be part of an object sense and avoid ("OSA") system. The OSA system, which may be onboard a vehicle, may include an object detection system, the ARPP system, and a flight controller system. The OSA system may also include a sensor array that interfaces with the object detection system. The OSA system repeatedly uses the sensor array to collect sensor data of any objects in an object field (i.e., field of perception) around the vehicle. For example, the sensor array may transmit radar signals and receive the return signals that are reflected by the objects. The object detection system then detects the objects and determines their locations based on the sensor data. For example, the object detection system may triangulate the location of an object based on return signals received by multiple sensors. The ARPP system then plans a next travel direction for the vehicle to avoid the detected objects. The OSA system then instructs the vehicle to travel in the travel direction until the process is repeated and a new travel direction is planned that takes into consideration the objects that are currently in the object field.

In some embodiments, the ARPP system, referred to an augmented-ARPP system, may factor in other measures of the objects in the field of perception of the current location when determining the travel direction. The augmented-ARPP system considers the space through which a vehicle can travel to the target location to be a travel or transit volume that is divided into sub-volumes that are also referred to as voxels, which may be cubes. Each voxel has 26 neighbor voxels that include six face neighbor voxels adjacent to its faces, 12 edge neighbor voxels adjacent to its edges, and 8 corner neighbor voxels adjacent to its corners. The distance from a voxel to a side neighbor voxel is 1 voxel distance, to an edge neighbor voxel is $\sqrt{2}$ voxel distances, and to a corner neighbor voxel is $\sqrt{3}$ voxel distances, where a voxel distance is the distance between the centers of a voxel and a face neighbor voxel. A voxel that contains an object is referred to as an object voxel, and a voxel that does not contain an object is referred to as a non-object or empty voxel.

To determine a travel path for a vehicle, the augmented-ARPP system may generate an environmental measure for each pair of empty neighbor voxels. For example, an environmental measure for a pair of voxels may be a distance measure indicating distance (e.g., in voxels) to a nearest object voxel and an object density measure indicating density of object voxels. The augmented-ARPP system may determine, based on the environmental measures, a travel path for the vehicle to travel from the current voxel to the target voxel. The augmented-ARPP system may represent the travel volume as a cost graph where vertices represent empty voxels, edges connect vertices of empty neighbor voxels, and costs are assigned to each edge. An environmental cost of an edge connecting a pair consisting of an empty voxel and an empty neighbor voxel is based on the environmental measures for the pair. To determine the travel path for a vehicle, the augmented-ARPP system applies a minimal cost path algorithm to the cost graph to determine the minimal cost path from a vehicle voxel (i.e., the voxel that contains the vehicle) to the target voxel. The augmented-ARPP system uses the minimal cost path as the travel path. The augmented-ARPP system selects the travel direction for a vehicle as the direction of the neighbor voxel of the vehicle voxel that is on the travel path.

The augmented-ARPP system may generate an overall travel path for vehicle, divide the travel path into segments between waypoints, and use an attract-repel model to determine the travel directions between waypoints. For example, the travel path may be selected based on past history of traveling from a starting location to the target location. For example, the starting location and target location may be at opposite ends of a city with tall buildings. In such a case, travel paths through the city may historically have taken longer that travel paths around the city, even though the travel paths through the city were shorter. For example, when traveling through the city, a vehicle may need to move at a slower speed and spend more time hovering than when traveling around the city. The augmented-ARPP system may select waypoints along the travel path around the city that are, for example, 100 meters apart. The augmented-ARPP system then applies the attract-repel model to determine the travel directions from one waypoint to the next waypoint. As another example, the travel path may be selected based on the environmental measures and a minimal cost graph algorithm as described below and in PCT Application No. PCT/US17/27253, entitled "Swarm Path Planner System for Autonomous Vehicles," filed on Apr. 12, 2017, which is hereby incorporated by reference.

Although the OSA system that employs the ARPP system is described primarily in the context of a vehicle that is a UAV, the OSA system may be used to control a variety of autonomous vehicles ("AVs") that are autonomously driven. The AVs may include UAVs, unmanned ground vehicles ("UGVs"), unmanned underwater vehicles ("UUVs"), and unmanned space vehicles ("USVs"). These vehicles are "unmanned" in the sense that a person does not control the guidance of the vehicle, irrespective of whether a person is actually on board the vehicle. For example, a UGV may transport several people with the UGV's guidance under the sole control of the OSA system (i.e., autonomously). For UGVs, the attract-repel model may be applied to a 2D environment, rather than a 3D environment. If the UGV is, for example, operating in a parking structure, the attract-repel model may consider the parking structure as a stack of plane—that is, one plane for each level of the parking structure. For UUVs, the sensor array may be sonar-based, but the OSA system would operate in a manner similar to that for UAVs. For USVs, the OSA system may be particularly useful in helping a satellite avoid collisions with space debris or other satellites. The OSA system for USVs may employ a larger field of perception to encompass a wider approach of objects. In addition, the OSA system may be augmented with the estimated locations of known space objects determined from orbital parameters (e.g., Keplerian elements) of the space objects to help in determining whether return signals correspond to an object. In some embodiments, the OSA system may not even employ a sensor array, but rather, may rely solely on the estimated locations of the known space objects such as those estimated from the orbital parameters, retrieved from a geographic information system of objects (e.g., buildings, power lines, and trees), determined on prior traversals, and so on. Also, although the OSA system is described primarily based on a field of perception that is in front of the UV, the field of perception may surround the UV. In such a case, the UV may include multiple sensor arrays to sense the entire area around the vehicle. Such a surrounding field of perception may be useful, for example, to sense and avoid objects (e.g., space debris) that are traveling toward the UV from the rear.

The ARPP system may select travel directions so that a UAV takes evasive maneuvers to avoid an imminent collision with an object. For example, a predator UAV may be attempting to intercept a prey UAV before it reaches its target by colliding with the prey UAV. In such a case, the OSA system of the prey UAV may calculate a new travel direction that is more than 90° away from the target direction because the predator UAV moved from to the left of the prey UAV to right in front of the prey UAV. If the prey UAV was traveling in the target direction, the sudden and significant change in the travel direction by the prey UAV is effectively an evasive maneuver to avoid colliding with the predator UAV. The new travel direction may result in the prey UAV rapidly ascending or descending or even reversing direction. If the prey UAV has a surrounding field of perception, then the OSA system can take evasive maneuvers even if the predator UAV approaches from the rear. In such a case, the OSA system may select a travel direction that is close to the target direction, but would override the selection because the predator UAV is too close. The OSA system may determine the predator UAV's travel direction based on successive location determinations and set the overriding travel direction to be, for example, perpendicular to the predator UAV's travel direction. If the field of perception was only in front of the prey UAV, the prey UAV may enter an evasive maneuver mode. While in the evasive maneuver mode, the prey UAV may continually orient itself in an attempt to keep the predator UAV within the transit volume while the predator UAV is within the range of the field of perception.

The OSA system may also be used to control movement in robotic systems such as fixed-base robotic systems and free-moving robotic systems. A fixed-base system, such as those used on production lines, typically includes a robot manipulator, an end effector (e.g., tool or gripper), and a safety interlock system. The fixed-base robotic system may be taught its motion using a teach pendant, which is typically a handheld unit used to program the trajectory of the robot. The safety interlock system may include force sensors to detect a collision or a light curtain sensor to disable the robot manipulator when a person is near the workspace of the fixed-base robotic system. The OSA system allows a fixed-base robotic system to detect intrusions and alter the trajectory of the robot manipulator. As a result, worker safety can be improved, and throughput of a capital-intensive production line can be maintained by avoiding costly shutdowns. In addition, use of the OSA system can eliminate the need to teach with a teach pendant and the need for force sensors or a light curtain sensor. The OSA system can be used to determine travel directions for picking up and placing parts for a production line. The OSA system can be used to direct the end effector to a target location of a part within the cell of the fixed-base system for pickup while avoiding neighboring cells, for example, by controlling the roll, pitch, and yaw of the robot manipulator. The OSA system can then be used to direct the end effector to a target that is the desired location of a part on a production line. The output of the OSA system can be used to generate and issue commands to the robot manipulator to slow down, change orientation, or signal readiness to dock, interlock, mate, operate a tool, and so on. A sensor array may be located on the robot manipulator near the end effector or at a fixed location.

Free-moving robotic systems include servant robots and companion robots. The OSA system can be used to generate travel direction when a robot is moving parts or supplies within a hospital, production line, shipping facility, and so on in a manner similar to determining a next travel direction for a UGV. The payload of the free-moving robotic system may be a tool, part, supply, sensing system, interactive communicator (for a companion robot), and so on. The target location is the desired destination of the robot. The desired destination may be a moving target, for example, such as the person that a companion robot is following. The OSA system allows the robot to move to the destination while avoiding stationary and moving objects. A sensor array may be located on the front of a free-moving robotic system. The OSA system may be used to navigate robotic systems safely, efficiently, and reliably through complex environments.

In some embodiments, the object detection system may determine the object location by images collected from a camera. A stereoscopic camera may be used to determine the 3D location of each object. Alternatively, an auto-focus mechanism may provide, for each foreground pixel, the object represented by the pixel. For each image collected, the object detection system applies an algorithm to identify groups of connected pixels that correspond to the same object. The object detection system also may employ an image segmentation technique.

Figure 3:
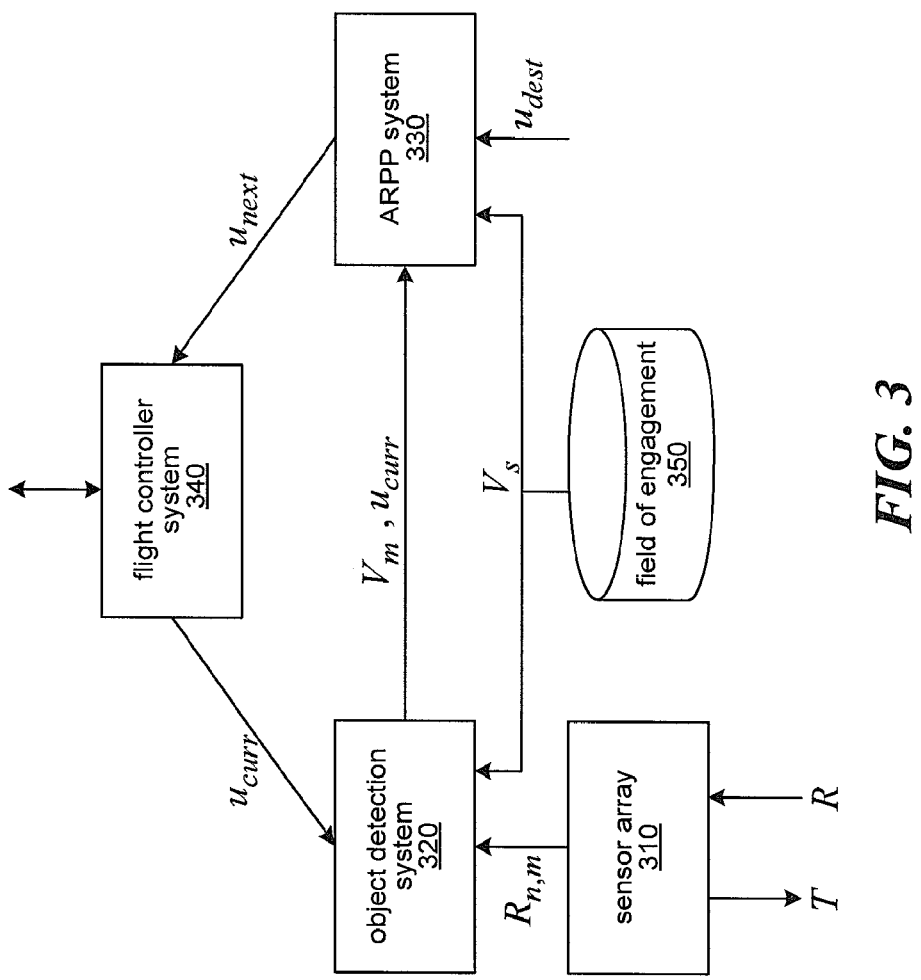
FIG. 3 is a block diagram illustrating components of an OSA system that employs the ARPP system in some embodiments.

FIG. 3 is a block diagram illustrating components of an OSA system that employs the ARPP system in some embodiments. The OSA system 300 includes a sensor array 310, an object detection system 320, an ARPP system 330, a flight controller system 340, and a field of engagement store 350. The sensor array transmits transmit signals T and receives return signals R. The sensor array provides the return signal $R_{n,m}$ corresponding to time n for receiver m. The object detection system is also provided with the current location relative to a fixed coordinate system as collected by the flight controller system that is converted to a current voxel $u_{curr}$. The object detection system provides to the ARPP system the current voxel of the vehicle and the object voxel of each detected object $V_m$ for time n. The ARPP system may also access the field of engagement store to retrieve the object voxels of known stationary objects $V_s$. The ARPP system is also provided with the target voxel west $u_{dest}$. For example, the target voxel may be 30 meters above a moving vehicle that the vehicle is to track. In such a case, the target voxel may be calculated based on the current location of the vehicle as reported by a location system (e.g., GPS system) on board the vehicle. The ARPP system calculates the travel direction and then provides the travel direction to the flight controller system, for example, as a next vehicle voxel $u_{next}$. The flight controller system directs the vehicle to travel in the travel direction. The object detection system, the ARPP system, and the flight controller system repeat their processing at intervals to determine the next travel direction given the objects currently in the travel volume.

In some embodiments, the object detection system and the ARPP system are implemented in software that is executed by an onboard processor of a UAV. The processor may send instructions via a Micro Air Vehicle Communication Protocol ("MAVLink") to an autopilot system of the UAV. The processor and the autopilot system may be connected via a Universal Asynchronous Receiver/Transmitter ("UART") connection. Suitable processors may include, for example, Odroid C1+, Odroid XU4, Raspberry Pi, Intel Edison, Intel NUC, Gigabyte Brix, and NVIDIA Jetson TK1. In some embodiments, aspects of the OSA system may be executed by a processor that is not on board. In such an embodiment, an onboard processor may include a WiFi interface to receive data from and transmit data to a ground station processor. If the ARPP system is executed by the ground station processor, then the onboard processor transmits the object locations or voxels identified by the objection detection system to the ground station processor and receives the travel directions and possibly the target location from the ground station processor. The onboard processor and the ground station processor may communicate via an Intel WiFi Link 5000 adapter.

In some embodiments, the ARPP system categorizes objects as stationary or moving. For example, a building is a stationary object, and a UV that is traveling is a moving object. A field of perception is a localized volume of the environment sensed by the UV at a given instant of time, which may include stationary and moving objects. A field of engagement is a much larger volume of the environment, which may include only stationary objects. Although a field of engagement can cover a much larger volume than a field of perception, the representation is static (because moving objects are not included), and the accuracy of the stationary objects may be subject to statistical uncertainty.

In some embodiment, the ARPP system may represent the locations of the vehicle, the target, and the objects as xyz coordinates in 3D space. Alternatively, the augmented-ARPP system may represent the locations as voxel coordinates when determining a travel path. In such a case, the field of perception and the field of engagement are 3D binary arrays of $N_v$ voxels (cubes of width $\Delta$ meters in the travel volume). Empty voxels are represented by a value of zero, and object voxels are represented by a value of one. A field of engagement can, for example, be generated from a high resolution digital surface model ("DSM"), which is a 2D array of surface heights versus xy location on a horizontal plane with typically one-meter xy grid spacing or better. The augmented-ARPP system may represent an object in the travel volume by fusing an instantaneous field of perception with a static field of engagement. As described above, the travel volume may be represented by a 3D binary array of voxels. In some embodiment, the travel volume is represented as a cost graph whose vertices each correspond to a different empty voxel and whose edges each point from some empty voxel to another empty voxel in its 3×3×3 neighborhood. The number of edges in a cost graph is $N_E < 26 N_v$. For a field of engagement, the target voxel may correspond to one vertex (namely, a target vertex). However, for a field of perception, if the target lies outside, the ARPP system may represent the empty voxel on the line of sight from the vehicle to the target that is closest to the target as the target vertex.

Because there are multiple paths of edges from a vehicle vertex to a target vertex, the augmented-ARPP system determines the optimal path. To determine the optimal path, the augmented-ARPP system assigns a cost to each edge of the cost graph. The augmented-ARPP system may use one of a variety of minimal cost path algorithms to determine the optimal path. For example, the minimal cost paths from the target vertex to all of the remaining vertices can be computed using Dijkstra's algorithm in $O(N_v^2)$ time. (See E. W. Dijkstra, "A Note on Two Problems in Connexion with Graphs," Numerische Mathematik, Vol. 1, 1959, pp. 269-271.) The augmented-ARPP system can reduce the time to $O[N_E+N_v \log_2 N_v < (26+\log_2 N_v)N_v]$ using a Fibonacci heap. (See Ravindra K. Ahuja, Kurt Mehlhorn, James B. Orlin, and Robert E. Tarjan, "Faster Algorithms for the Shortest Path Problem," Journal Assoc. Comput. Mach., Vol. 37, No. 2, April 1990, pp. 213-223.) The solution to the minimal cost path problem can be visualized as a 3D array of pointing vectors along an optimal path and their associated costs with no pointing vectors pointing from empty voxels to object voxels. One pointing vector emanates from each empty voxel and terminates either on another empty voxel in its 3×3×3 neighborhood or on the target voxel (if in its 3×3×3 neighborhood). The pointing vectors will thus have lengths of 1, $\sqrt{2}$, or $\sqrt{3}$ voxels. Each pointing vector represents a leg on the minimal cost path from the emanating empty voxel to the target voxel through some empty neighbor voxel. If the target and objects do not move, the Dijkstra's algorithm need only be applied once to determine the minimal cost path from each empty voxel in the field of engagement to the target voxel. If the target or the objects move, then the minimal cost path needs to be periodically (at each time interval) determined from the current voxel to the target voxel. In such a case, the ARPP system may use an A*algorithm. (See, Peter Hart, Nils Nilsson, and Bertram Raphael, "A Formal Basis for the Heuristic Determination of Minimum Cost Paths," IEEE Transactions on Systems Science and Cybernetics, Vol. 4, Issue. 2, pp. 100-107 (1968), which is incorporated by reference.)

In some embodiments, the augmented-ARPP system assigns costs to the edges based on environmental measures. The augmented-ARPP system assigns costs to each graph edge based on some combination of environmental measures. For an edge $E=V_0 \rightarrow V_1$ emanating from an empty voxel $(i_0, j_0, k_0)$ and terminating on the empty neighbor voxel $(i_1, j_1, k_1)$ where max $[|i_0-i_1|, |j_0-j_1|, |k_0-k_1|]=1$, the augmented-ARPP system assigns an associated cost $c(E)=c(V_0 \rightarrow V_1)$. In general, the cost for a set $y=[y_1 \ldots y_m]$ of m environmental measures can be represented by Equation 4:

$$c(E) = f(y(E)) = \max_{i=1\ldots m} c_i(y_i(E)) \quad (4)$$

where $c_i(y_i(E)) \in [0,1]$ is a cost function for environmental measure i. An edge with a cost of one means that traversal along that edge is not allowed.

Table 1 provides examples of environmental measures that may be used by the augmented-ARPP system. One environmental measure is the distance to an object (whether stationary or moving). In Table 1, DT represents the "distance transform," and DT(V) represents the voxel distance from voxel V to the nearest object voxel associated with either a stationary or moving object. The augmented-ARPP system may employ various distance transform algorithms. (See, e.g., Calvin Maurer, Rensheng Qi, and Vijay Raghavan, "A Linear Time Algorithm for Computing Exact Euclidean Distance Transforms of Binary Images in Arbitrary Dimensions," IEEE Transactions on Pattern Analysis and Machine Intelligence, Vol. 25, No. 2, February 2003, pp. 265-270.) The augmented-ARPP system computes DTs in real time within an instantaneous field of perception or in advance within a field-of-engagement. The augmented-ARPP system may ignore object voxels that are too remote from the vehicle voxel, referred to as a remote distance $d_{remote}$. A larger value of $d_{remote}$ leads to environmental constraints on vehicle motion dynamics that are less localized.

TABLE 1

| | Cost Criterion | | |
|---|---|---|---|
| Name | Formula | | Example Cost Function |
| distance to stationary objects | $d_s(E) = \min[DT_s(V_0), DT_s(V_1), d_{remote}]$ | | $c_1(d_s) = 1 - d_s/d_{remote}$ |
| density of stationary objects | $\rho_s(E) = \dfrac{\text{num obstacle voxels in } \Omega(V_0, d_{remote})}{\text{num voxels in } \Omega(V_0, d_{remote})}$ | | $c_2(\rho_s) = \dfrac{\min(\rho_s, \rho_{s,max})}{\rho_{s,max}}$ |
| distance to moving objects | $d_m(E) = \min[DT_m(V_0), DT_m(V_1), d_{remote}]$ | | $c_3(d_m) = 1 - d_m/d_{remote}$ |
| density of moving objects | $\rho_m(E) = \dfrac{\text{num mover voxels in } \Omega(V_0, d_{remote})}{\text{num voxels in } \Omega(V_0, d_{remote})}$ | | $c_4(\rho_m) = \dfrac{\min(\rho_m, \rho_{m,max})}{\rho_{m,max}}$ |
| zone/corridor permeability | $\rho_Z(E) = \max[\rho_Z(V_0), \rho_Z(V_1)]$ | | $c_5(\rho_Z) = \rho_Z$ |
| disparity in edge vs. attract-repel direction | $\theta(E) = $ angle between $d_{PC}(V_0)$ and $d(E)$ | | $c_6(\theta) = \dfrac{1-\cos\theta}{2+\varepsilon}$ ($\varepsilon$ is a small positive number) |

Figure 4:
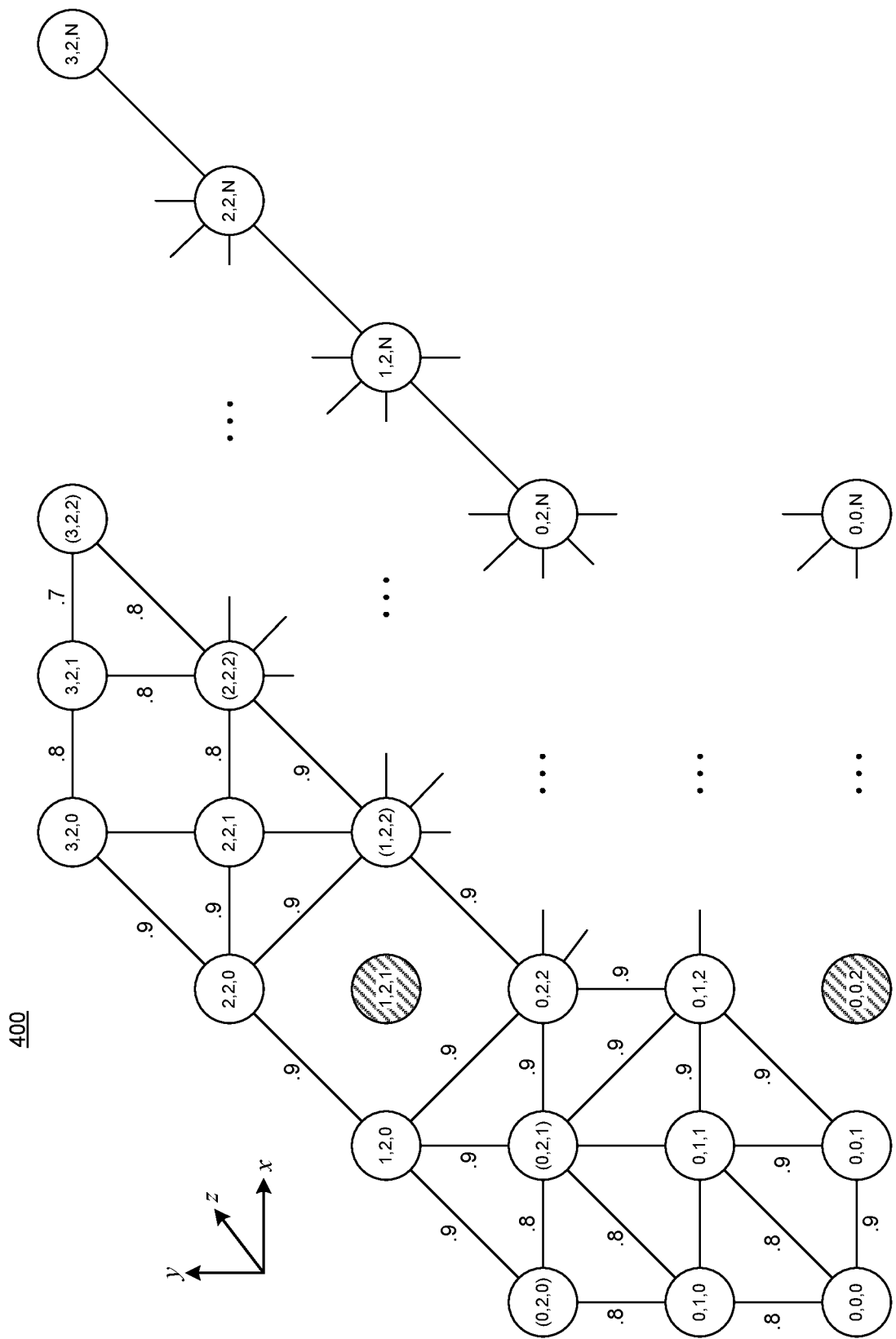
FIG. 4 is a diagram that illustrates an example cost graph that indicates costs based on the distance transforms.

FIG. 4 is a diagram that illustrates an example cost graph that indicates costs based on the distance transforms. A cost graph 400 includes vertices represented as circles that correspond to the voxels of the travel volume and edges represented as lines connecting empty voxels. Each circle contains the voxel coordinates (x, y, z) that uniquely identify each voxel. The unshaded circles represent empty voxels, and the shaded circles represent object voxels. The shaded circles have no connected edges to indicate that a travel path through the object voxel is not allowed. The numbers next to the edges represent the costs. For example, because the empty voxel (0, 0, 1) is adjacent to the object voxel (0, 0, 2), it is assigned a distance transform of 1. Because object voxels (0, 0, 0) and (0, 1, 0) are adjacent to empty voxels that have distance transforms of 1, they are assigned distance transforms of 2 (using a Manhattan distance metric). The augmented-ARPP system assigns a cost of 0.9 (1.0-1.0/10) to the edge between object voxels (0, 0, 0) and (0, 0, 1) assuming the remote distance $d_{remote}$ is 10. The augmented-ARPP system also assigns a cost of 0.8 (1.0-2.0/10) to the edge between object voxels (0, 0, 0) and (0, 1, 0). Thus, when determining the minimal cost path from vehicle voxel (0, 0, 0) to target voxel (3, 2, 2), the augmented-ARPP system may determine path (0, 0, 0), (0, 1, 0), (0, 2, 0), (1, 2, 0), (2, 2, 0), (3, 2, 0), (3, 2, 1), and (3, 2, 2).

As indicated by Table 1, the augmented-ARPP system may employ an object density measure for stationary objects $\rho_s(E)$ or moving objects $\rho_m(E)$ in a region to indicate how easy or difficult it might be to traverse that region. ($\Omega(V_0, d_{remote})$ is the cubic neighborhood of half-width $d_{remote}$ voxels centered on voxel $V_0$ at location ($i_0, j_0, k_0$).) The augmented-ARPP system increases the cost of edges as the object density measure increases. The augmented-ARPP system may also employ a permeability measure $\rho_z$ of a region or zone Z on a per-voxel basis independent of object density. For example, a zone or corridor might be designated as "no-fly" or "fly through only if absolutely necessary." In such a case, the augmented-ARPP system may input the permeability measures for the voxels of the zone. The augmented-ARPP system may set the permeability measure for an edge to the maximum of $\rho_z$ for the empty voxel that the edge emanates from, and $\rho_z$ for an empty neighbor voxel. In some embodiments, the augmented-ARPP system may employ the ARPP system to calculate a travel direction and uses the difference between that travel direction and the direction of a neighboring empty voxel as an environmental measure associated with the edge between the current location and the neighboring empty voxel. In such a case, the augmented-ARPP system sets the travel direction based on the optimal travel direction associated with the minimal cost path to the target location.

The augmented-ARPP system ensures that the cost associated with a traversal path from a vehicle voxel to the target voxel increases linearly with path length. The ARPP system may weight the costs by traversal distance, as represented by Equation 5:

$$c_{environmental}(E) = \begin{cases} (\|E\|/\sqrt{3}) \cdot c(E) & c(E) < 1 \\ 1 & c(E) = 1 \end{cases} \quad (5)$$

where $\|E\|=1$, $\sqrt{2}$ or $\sqrt{3}$. Thus, $c_{environmental}(E) \in [0,1]$, $c_{environmental}(E) \leq c(E)$, and $c_{environmental}(E)=1$ if and only if $c(E)=1$ (i.e., traversal from $V_0$ to $V_1$ is not allowed).

A radar, sonar, LIDAR, or acoustic-based collision avoidance system for a vehicle typically performs multiple tasks in sequence to sense the surrounding environment, detect stationary and moving objects, and determine an optimal path to avoid collisions. Radar is one approach that offers advantages in simplicity of design and analysis, and the ability to operate at night or in inclement weather. An OSA system consists of an array of radar antennas mounted on the drone, a set of transmitters to generate pulses for the antennas, a receiver system for collecting and amplifying the reflected pulses, and a processor for interpreting the reflections and determining the optimal speed and direction of the vehicle to avoid collisions. Methods for processing received signals are described in PCT Patent Application No. PCT/US16/41208, entitled "Object Sense and Avoid System for Autonomous Vehicles," filed on Jul. 6, 2016, which is hereby incorporated by reference. The output of these methods is a set of contact points (e.g., objects) in space that represent the sources of the reflected pulses. A contact point could be generated by a reflection from a point-like object, moving or stationary, by specular reflection from the surface of a larger object, or by a reflection from the edge or corner of a larger object. These possibilities, in general, cannot be distinguished from a single collection of the radar. They might be distinguishable by tracking how the contact points move over multiple radar looks as the vehicle moves. Nevertheless, the primary use of the contact points is to provide information to the vehicle about regions to avoid as it navigates toward a predetermined location (i.e., the target). If an object is large (e.g., a building or a bridge), the object detection system may represent the "object" as a collection of object locations. For example, a building with a base that is 20 square meters and a height of 50 meters be represented by 100 objects on 5 meter sub-cubes on the faces of the building.

Figure 5:
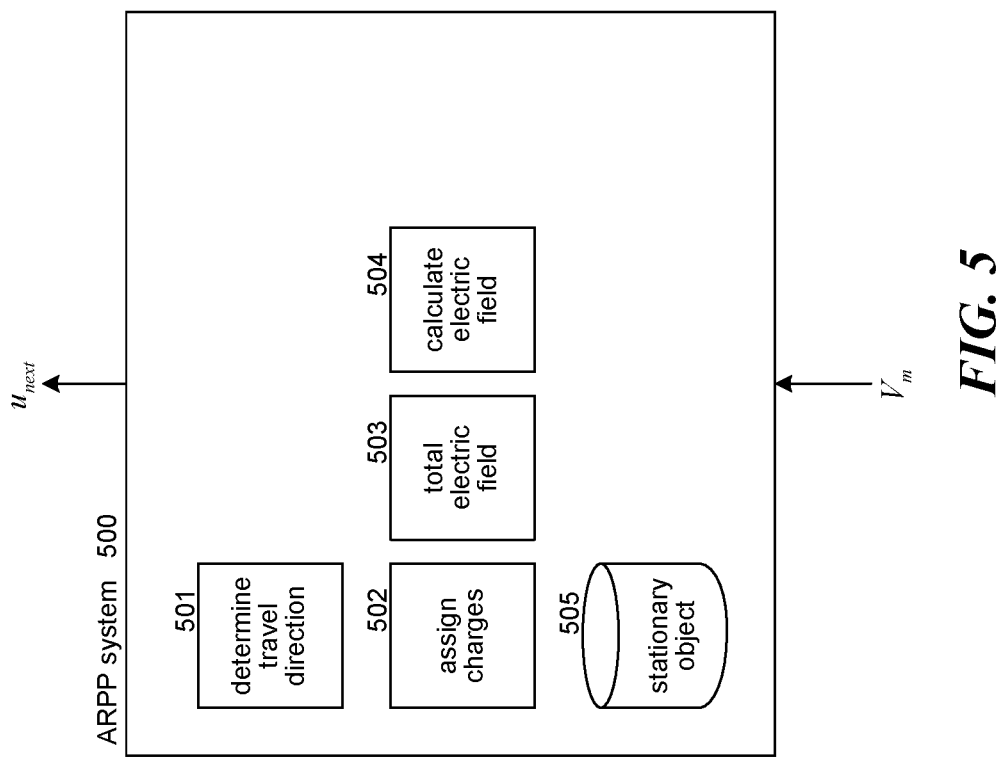
FIG. 5 is a block diagram illustrating components of the ARPP system in some embodiments.

FIG. 5 is a block diagram illustrating components of the ARPP system in some embodiments. An ARPP system 500 includes a determine travel direction component 501, an assign charges component 502, a total electric field component 503, and a calculate electric field component 504. The ARPP system also includes a "stationary object" store 505 that stores information relating to stationary objects in the field of engagement. The determine travel direction component determines the next travel direction for a vehicle based on the current location, the target location, and the object locations. The assign charges component assigns electrostatic charges as repel values and an attract value to the object locations and the target location. The total electric field component calculates the total electric field as the attract-repel field at the current location. The calculate electric field component calculates the electric field as a repulsive force or an attractive force at the current location based on the charge assigned to a location.

Figure 6:
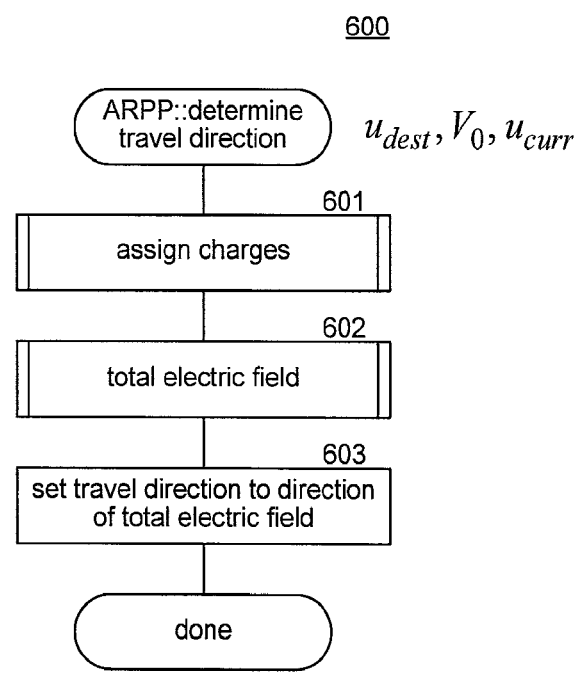
FIG. 6 is a flow diagram that illustrates processing of a travel direction component of the ARPP system in some embodiments.

FIG. 6 is a flow diagram that illustrates processing of a travel direction component of the ARPP system in some embodiments. A travel direction component receives a target location, a current location, and object locations and determines a next travel direction for the vehicle at the current location using an electrostatic charge-based model for the attract-repel model. In block 601, the component invokes an assigned charges component to assign repel values to the object locations and an attract value to the target location. In block 602, the component invokes a total electric field component to generate an attract-repel field for the current location. In block 603, the component sets the travel direction to the direction of the attract-repel field and then completes.

Figure 7:
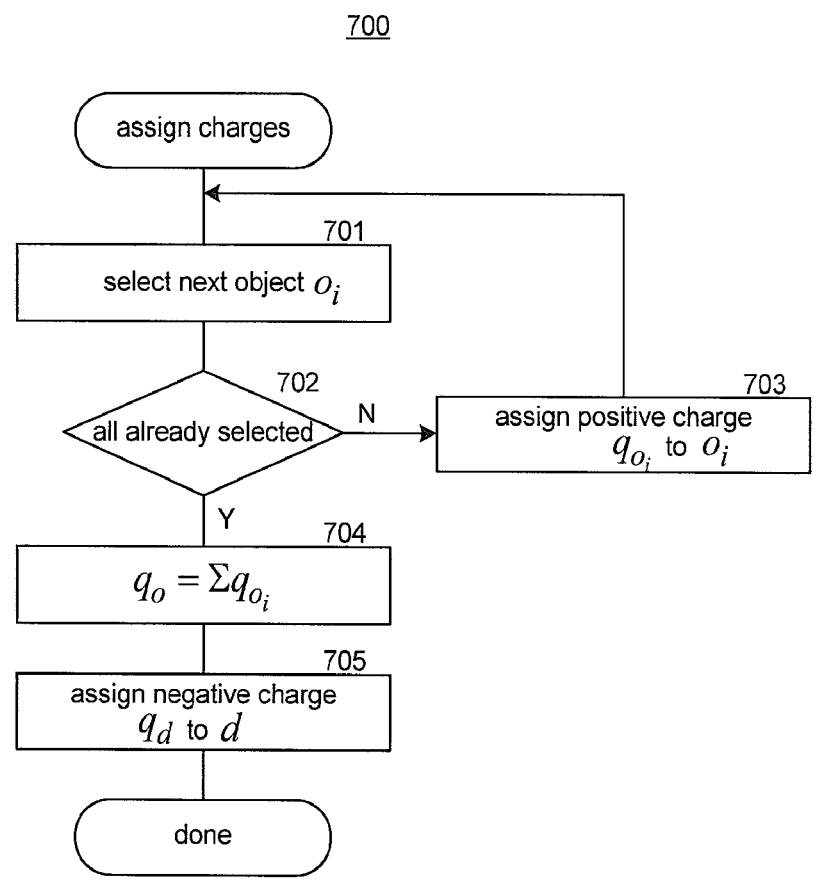
FIG. 7 is a flow diagram that illustrates the processing of the assign charges component of the ARPP system in some embodiment.

FIG. 7 is a flow diagram that illustrates the processing of the assign charges component of the ARPP system in some embodiments. An assign charges component 700 assigns quantities of an electrostatic charge to each object location and the target location to represent the repel values and the attract value. In block 701, the component selects the next object. In decision block 702, if all the objects have already been selected, then the component continues at block 704, else the component continues at block 703. In block 703, the component assigns a quantity of a positive charge to the object location of the selected object and loops to block 702 to select the next object. In block 704, the component totals the quantities of the positive charges assigned to the object locations. In block 705, the component assigns a quantity of a negative charge to the target location based on the total of the quantities of the positive charges assigned to the object locations. The component then completes.

Figure 8:
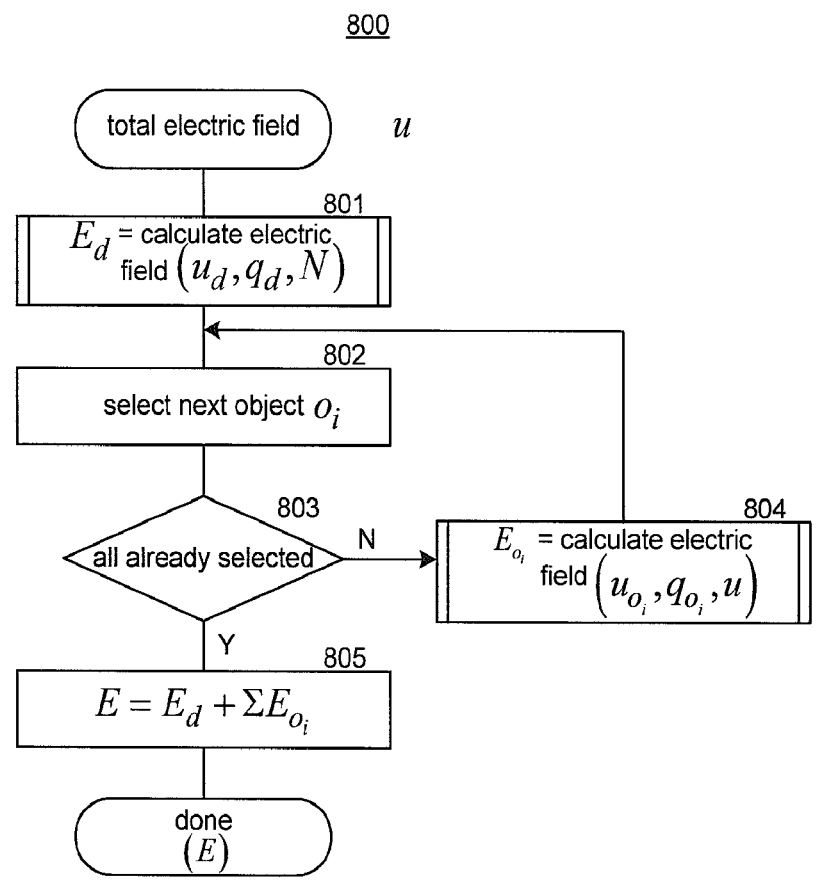
FIG. 8 is a flow diagram that illustrates processing of a total electric field component of the ARPP system in some embodiments.

FIG. 8 is a flow diagram that illustrates processing of a total electric field component of the ARPP system in some embodiments. A total electric field component 800 calculates the total electric field for the current location based on the positive and negative charges assigned to the object locations and the target location. In block 801, the component invokes a calculate electric field component to calculate the electric field at the current location attributable to the negative charge at the target location. In block 802, the component selects the next object. In decision block 803, if all the objects have already been selected, then the component continues at block 805, else the component continues at block 804. In block 804, the component invokes the calculate electric field component to calculate the electric field at the current location based on the positive charge of the object location of the selected object. The component then loops to block 802 to select the next object. In block 805, the component generates a summation of the electric fields and then completes.

Figure 9:
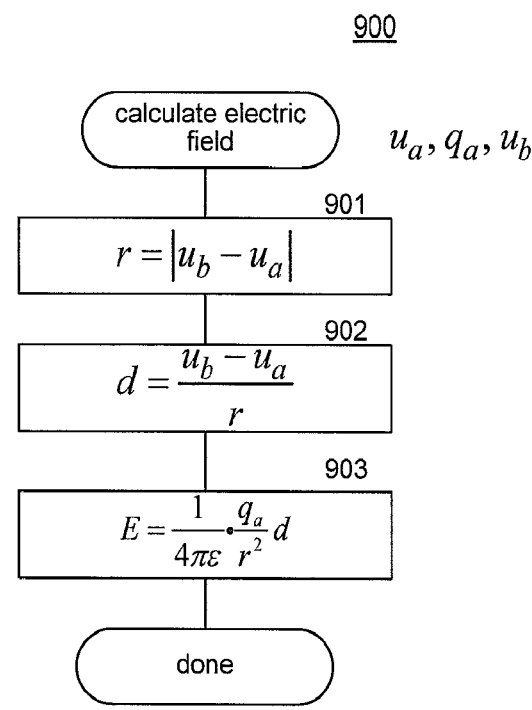
FIG. 9 is flow diagram that illustrates processing of a "calculate electric field" component of the ARPP system in some embodiments.

FIG. 9 is a flow diagram that illustrates processing of a calculate electric field component of the ARPP system in some embodiments. A calculate electric field component 900 is invoked to determine the electric field at the current location based on a quantity of the charge assigned to a specified location. In block 901, the component calculates the distance from the current location to the specified location. In block 902, the component generates a unit vector that is in the direction from the specified location to the current location when the electrostatic charge assigned to the specified location is positive and in the opposite direction when the electrostatic charge assigned to specified location is negative. In block 903, the component calculates the electric field at the current location based on the quantity of the electrostatic charge assigned to the specified location and then completes.

Figure 10:
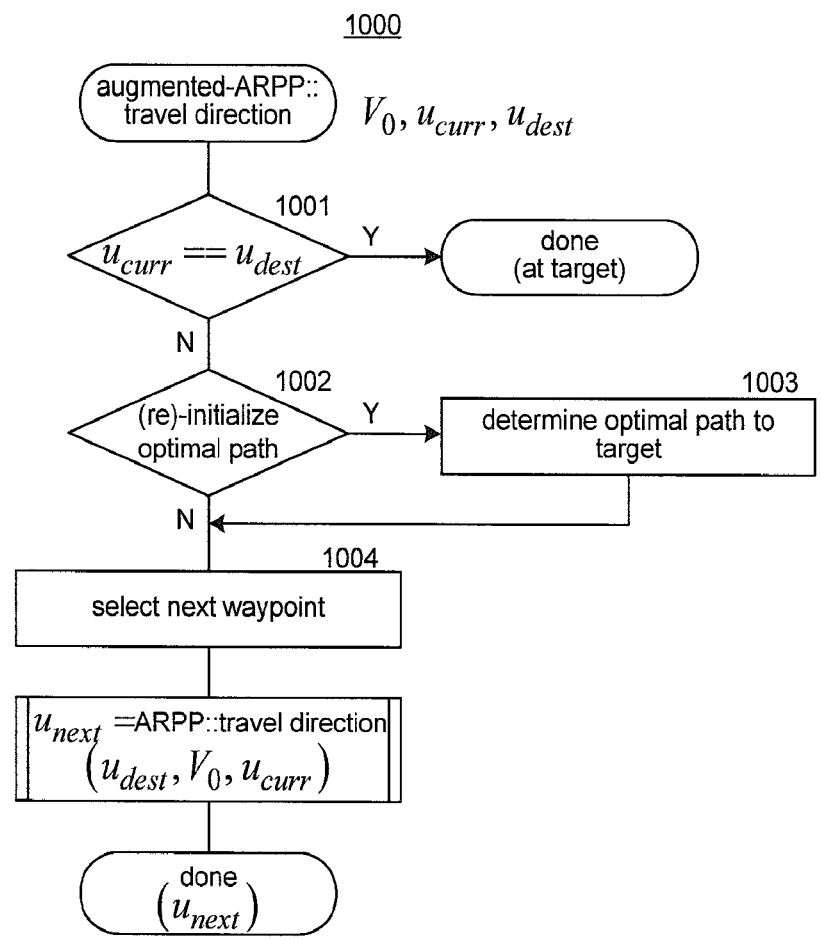
FIG. 10 is a flow diagram that illustrates processing of a "determine travel direction" component of an augmented-ARPP system in some embodiments.

FIG. 10 is a flow diagram that illustrates processing of a determine travel direction component of an augmented-ARPP system in some embodiments. A determine travel direction component 1000 receives a current location, a target location, and object locations and determines the next travel direction for a vehicle to travel from the current location to the target location while avoiding the object locations factoring in environmental measures. In decision block 1001, if the current location is the same as the destination location, then the component returns an indication that the vehicle is at the target location, else the component continues at 1002. In decision block 1002, if an optimal travel path from the current location to the target location needs to be calculated or recalculated, then the component continues at block 1003, else the component continues at block 1004. In block 1003, the component determines the optimal travel path to the target location based on various environmental measures. The component may need to recalculate the optimal travel path, for example, if the vehicle could not travel to a previously selected waypoint as planned. In block 1004, the component selects the next waypoint along the optimal travel path. In block 1005, the component invokes the determine travel direction component of the ARPP system to determine the next travel direction to the selected waypoint based on an attract-repel model. The component then completes.

The following paragraphs describe various embodiments of aspects of the OSA system. An implementation of the OSA system may employ any combination of the embodiments. The processing described below may be performed by a computing device with a processor that executes computer-executable instructions stored on a computer-readable storage medium that implements the OSA system.

In some embodiments, a computing system for identifying a travel direction that avoids objects when traveling from a current location to a target location is provided. The computing system comprises one or more computer-readable storage media storing computer-executable instructions and one or more processors for executing the computer-executable instructions stored in the one or more computer-readable storage media. The computer-executable instructions, when executed, control the computing device to, for each of a plurality of intervals perform the following processing. The processing receives object locations of objects. The object locations are identified from return signals of signals transmitted by a sensor array, and each object location specifying a single point. The processing assigns a repel value to the object location of each object, the repel value indicating a repulsive force exerted in a direction from the object location to the current location. The processing assigns an attract value to the target location, the attract value indicating an attractive force exerted in a direction of the current location to the target location. The processing calculates an attract-repel field for the current location based on the repulsive forces and their directions and the attractive force and its direction. The attract-repel field is a vector with a direction. The processing also indicates that the travel direction is in the direction of attract-repel field. In some embodiments, the attract-repel field for the current location is calculated based on the repulsive forces and the attractive force exerted on the current location. In some embodiments, a force exerted on the current location that is based on a value assigned to a location is determined based on a force law and the assigned value and the distance between the current location and that location. In some embodiments, a force exerted on the current location that is based on a value assigned to a location monotonically decreases based on distance from that location. In some embodiments, a force exerted on the current location that is based on a value assigned to a location exponentially decreases based on distance from that location. In some embodiments, the attract value varies based on risk tolerance of avoiding objects. In some embodiments, the repel values vary based on risk tolerance of avoiding objects. In some embodiments, the magnitude of the repel value assign to an object location varies based on an object uncertainty. In some embodiments, the travel direction is determined at intervals and object locations of a prior interval are available in a current interval so that the travel direction is determined for the current interval based on a repel value assigned to a prior object location of the prior interval even though the prior object location is not otherwise available for the current interval. In some embodiments, the repel value assigned to the prior object location decays over time.

In some embodiments, a method performed by a computing system for determining a travel direction that avoids objects when traveling from a current location to a target location is provided. For each of a plurality of intervals during travel to the target location, the method transmits signals from a sensor array. The method receives return signals. The return signals are the transmitted signals that are reflected by objects. The method determines a location of each object, each location specifying a point. The method assigns a quantity of an object charge to the location of each object. The method assigns a quantity of a target charge to the target location, wherein the object charge and the target charge are opposite charges. The method calculates a total field at the current location resulting from the quantities of the object charge and the quantity of the target charge. The total field has a direction. The method indicates that the travel direction is the determined direction. In some embodiments, the calculating of the total field at the current location comprises for each assigned quantity, calculating a field resulting from the assigned quantities and summing the calculated fields. In some embodiments, the fields represent electric fields that are based on a force law. In some embodiments, the field for a charge monotonically varies based on distance from the location of the charge. In some embodiments, the field for a charge exponentially varies based on distance from the location of the charge. In some embodiments, the absolute value of the sum of the quantities of the object charge assigned to the locations of the objects is equal to the quantity of the target charge assigned to the target location. In some embodiments, the quantity of the target charge assigned to the target location is increased so that determined travel direction is closer to the direction from the current location to the target location. In some embodiments, the quantity of the target charge assigned to the location of the target is decreased so that the determined travel direction is farther from the direction from the current location to the target location. In some embodiments, the quantities of the object charge assigned to the locations of the objects vary based on an object uncertainty. In some embodiments, the determining of the travel direction is performed at intervals and object locations from a prior interval are available in a current interval so that the travel direction is determined for the current interval based on a prior object whose object location was received for the prior interval even though the object location of the prior object was not received for the current interval. In some embodiments, the quantity of an object charge assigned to the prior object decays over time.

In some embodiments, a method performed by a computing system for determining a travel direction to avoid objects when traveling from a current location to a target location is provides. For each of a plurality of intervals during travel to the target location, the method receives object locations of objects. The object locations are identified from return signals of signals transmitted by a sensor array, and each object location specifies a point. For each pair of neighboring empty locations, the method provides an environmental measure associated with traveling between the empty locations when traveling to the target location. The environmental measures are based on object locations near a pair of neighboring empty locations. The method identifies a waypoint location along a travel path from the current location to the target location. The travel path is determined based on the environmental measures. The method receives locations of objects. The method assigns a quantity of an object charge to the location of each object. The method assigns a quantity of a waypoint charge to the waypoint location, wherein the object charge and the waypoint charge are opposite charges. The method calculates a total field at the current location resulting from the quantities of the object charge and the quantity of the waypoint charge. The total field has a direction. The method indicates that the travel direction is the determined direction. In some embodiments, the travel path is determined by applying a minimal cost path algorithm to a cost graph representation of reference locations where vertices represent locations, edges between vertices represent that the locations of the vertices are neighbors, and costs derived from the environmental measures are associated with the edges. In some embodiments, the environmental measures are based on locations of stationary objects to be avoided. In some embodiments, the environmental measures associated with stationary objects are calculated prior to travel and the environmental measures associated with moving objects are calculated during travel. In some embodiments, the environmental measures are selected from a group consisting of a transform distance measure, an object density measure, and a zone permeability measure. In some embodiments, the determining of the environmental measures associated with moving objects is performed during travel of a vehicle at time intervals. In some embodiments, a time interval is adjusted based on risk tolerance of a vehicle colliding with an object. In some embodiments, the environmental measures are based on locations of objects that are within a remote distance of a location. In some embodiments, the remote distance is adjusted based on risk tolerance of a vehicle colliding with an object.

Although the subject matter has been described in language specific to structural features and/or acts, it is to be understood that the subject matter defined in the appended claims is not necessarily limited to the specific features or acts described above. Accordingly, the invention is not limited except as by the appended claims.

The invention claimed is:

1. A computing system for identifying a travel direction that avoids objects when an autonomous vehicle (AV) travels from a current location to a target location, the computing system comprising:
   one or more computer-readable storage media storing computer-executable instructions that, when executed, control the computing system to, for each of a plurality of intervals when traveling from the current location to the target location:
      receive object locations of objects in a current field of perception of the AV for a current interval of the plurality of intervals, the object locations being identified from return signals of signals transmitted by a sensor array on the AV, at least some of the objects being moving objects;
      access object locations of objects that are not in the current field of perception of the AV but were in a prior field of perception of the AV of a prior interval of the plurality of intervals;
      assign a repel value to an object location of each object of the objects in the current field of perception of the AV to produce a plurality of repel values, each repel value indicating a repulsive force exerted from the object location to the current location, the plurality of repel values indicating respectively a plurality of repulsive forces;
      assign an attract value to the target location, the attract value indicating an attractive force exerted from the current location to the target location;
      calculate an attract-repel vector for the current location based on the plurality of repulsive forces and their directions and the attractive force and its direction, the attract-repel vector having a direction; and
indicate that the travel direction is in the direction of the attract-repel vector; and
one or more processors for executing the computer-executable instructions stored in the one or more computer-readable storage media.

2. The computing system of claim 1 wherein the attract-repel vector for the current location is calculated based on the plurality of repulsive forces and the attractive force exerted from the current location to the target location.

3. The computing system of claim 1 wherein a repulsive force indicated by any of the plurality of repel values and exerted on the current location or an attractive force indicated by any of the plurality of attract values and exerted on the current location is determined based on a force law and an assigned value and a distance between the current location and that object location.

4. The computing system of claim 1 wherein a repulsive force indicated by any of the plurality of repel values and exerted on the current location or an attractive force indicated by any of the plurality of attract values and exerted on the current location monotonically decreases based on distance from that object location.

5. The computing system of claim 1 wherein a repulsive force indicated by any of the plurality of repel values and exerted on the current location or an attractive force indicated by any of the plurality of attract values and exerted on the current location exponentially decreases based on distance from that object location.

6. The computing system of claim 1 wherein the attract value varies based on risk tolerance of colliding with any object.

7. The computing system of claim 1 wherein the plurality of repel values vary based on risk tolerance of colliding with any object.

8. The computing system of claim 1 wherein a repel value assigned to an object location of any object of the objects that are not in the current field of perception but were in a prior field of perception of the AV of a prior interval of the plurality of intervals decays over time.

9. The computing system of claim 1 wherein the attractive force and the repulsive forces represent an attract-repel field and the attract-repel vector represents a cumulative force magnitude and direction exerted at the current location.

10. The computing system of claim 1 wherein the instructions further include instructions that, when executed, control the computing system to access object locations of stationary objects that are within a field of engagement that is larger than the current field of perception of the AV.

11. The computing system of claim 10 wherein the object locations of stationary objects that are within the field of engagement include object locations of stationary objects that are not within the current field of perception of the AV and were not within a prior field of perception of the AV.

12. A method performed by a computing system for determining a travel direction for an autonomous vehicle (AV) that avoids objects when traveling from a current location to a target location, the method comprising:
for each of a plurality of intervals during travel to the target location,
transmitting signals from a sensor array on the AV;
receiving return signals, the return signals being the transmitted signals that are reflected by objects;
determining a location of each object;
accessing a location of an object that is not in a current field of perception of the AV but was in a prior field of perception of the AV of a prior interval of the plurality of intervals;
assigning a quantity of an object charge to the location of each object of one or more objects within the current field of perception of the AV;
assigning a quantity of a target charge to the target location, wherein the object charge associated with the location of each of the one or more objects within the current field of perception of the AV is opposite to the target charge;
calculating a total field at the current location resulting from quantities of the object charge associated with the objects and a quantity of the target charge, the total field having a direction and terminating at the target location; and
indicating that the travel direction is the direction of the total field; and
directing the AV to travel in the travel direction.

13. The method of claim 12 wherein the calculating of the total field at the current location comprises:
for each assigned quantity of object charge, calculating a field resulting from the assigned quantity of object charge, to produce a plurality of calculated fields; and
summing the plurality of calculated fields to produce the total field.

14. The method of claim 13 wherein the calculated fields represent electric fields that are based on a force law.

15. The method of claim 13 wherein a calculated field of the plurality of calculated fields, for an object charge associated with the location of any of the one or more objects within the current field of perception of the AV, monotonically varies based on distance from a location of that object charge to a current location of the AV.

16. The method of claim 13 wherein a calculated field of the plurality of calculated fields, resulting from any said assigned quantity of object charge, exponentially varies based on distance from the location of the object charge.

17. The method of claim 12 wherein an absolute value of a sum of quantities of object charge assigned to locations of the objects is equal to a quantity of target charge assigned to the target location.

18. The method of claim 12 wherein a quantity of target charge assigned to the target location is increased to adjust a relationship between the travel direction and a direction from the current location to the target location.

19. The method of claim 12 wherein a quantity of target charge assigned to the location of the target is decreased to adjust a relationship between the travel direction and a direction from the current location to the target location.

20. The method of claim 12 wherein a quantity of object charge assigned to the location of the object that is not in the current field of perception of the AV but was in a prior field of perception of the AV of a prior interval of the plurality of intervals decays over time.

21. The method of claim 12 wherein the attractive force and the repulsive forces represent an attract-repel field and the attract-repel vector represents a cumulative force magnitude and direction exerted at the current location.

22. The method of claim 12 further comprising accessing object locations of stationary objects that are within a field of engagement that is larger than the current field of perception of the AV.

23. The method of claim 22 wherein the object locations of stationary objects that are within the field of engagement include object locations of stationary objects that are not within the current field of perception of the AV and were not within a prior field of perception of the AV.

* * * * *